United States Patent [19]

Skala

[11] 4,064,513

[45] Dec. 20, 1977

[54] INK DROP CHARACTER LINE PRINTER WITH TRAVERSING ORIFICE BAND

[76] Inventor: Stephen F. Skala, 3839 S. Wenonah, Berwyn, Ill. 60402

[21] Appl. No.: 691,140

[22] Filed: May 28, 1976

Related U.S. Application Data

[63] Continuation-in-part of Ser. No. 605,993, Aug. 20, 1975, Pat. No. 3,971,040, and Ser. No. 605,992, Aug. 20, 1975, Pat. No. 3,972,053.

[51] Int. Cl.[2] .......................... G01D 15/18; G01D 9/00

[52] U.S. Cl. .......................................... 346/75; 346/1

[58] Field of Search .................. 346/75, 140; 101/426

[56] References Cited

U.S. PATENT DOCUMENTS

| | | | |
|---|---|---|---|
| 3,938,163 | 2/1976 | Fujimoto et al. | 346/75 |
| 3,971,040 | 7/1976 | Skala | 346/75 |
| 3,972,053 | 7/1976 | Skala | 346/75 |
| 3,992,712 | 11/1976 | Dill et al. | 346/75 X |

*Primary Examiner*—George H. Miller, Jr.

[57] ABSTRACT

A signal responsive printer selectively deposits drops of liquid ink onto a moving sheet of ordinary paper to form a line of characters. A flexible endless orifice band having a plurality of uniformly spaced orifices traverses a stationary ink source to form ink drops which are chargeable between a corresponding plurality of charging electrodes. Charged ink drops are deflected in direct proportion to their charge between deflecting electrodes to form successive columns of a character dot matrix as the orifice band advances. In order to prevent distortion of a character, an additional deflection compensates for paper motion. Uncharged ink drops deposit on an ink catcher, are drawn into an ink reservoir, and are pumped back to the ink source.

5 Claims, 3 Drawing Figures

INK DROP CHARACTER LINE PRINTER WITH TRAVERSING ORIFICE BAND

The present application is a continuation-in-part of application Ser. No. 605,993 filed Aug. 20, 1975 and U.S. Pat. No. 3,971,040 and of application Ser. No. 605,992 filed Aug. 20, 1975 now U.S. Pat. No. 3,972,053.

BACKGROUND OF THE INVENTION

This invention relates to printing of graphic characters and more particularly to such printing with selective deflection of ink drops issuing from orifices in a traversing endless orifice band.

Basic features of an orifice band printer are disclosed in copending patent application Ser. No. 605,993 now U.S. Pat. No. 3,971,040 entitled INK DROP PRINTER WITH TRAVERSING ORIFICE BAND and various methods of selective ink drop deflection are disclosed in copending patent application Ser. No. 605,992 now U.S. Pat. No. 3,971,053 entitled INK DROP PRINTER WITH TRANSFER MEMBERS. Briefly, a flexible endless band having a plurality of uniformly spaced orifices is drawn through a stationary ink source. Liquid ink issuing under pressure from the orifices forms columns of monodisperse ink drops which have the linear and constant speed traversing motion of the orifice band. Ink drops can be selectively deflected in response to signals and removed from the ink drop columns. Undeflected ink drops deposit along a line on an advancing sheet of ordinary paper to form a graphic image. Such prior ink drop printers which require only one level of ink drop deflection for facsimile printing did not provide ink drop deflection through a plurality of levels perpendicular to the motion of the orifice band to print characters in successive columns as the orifice band advances. Further, such printers were not required to provide an additional deflection to compensate for character distortion caused by paper motion which may be constant or which may be changing when printing is starting or stopping.

An ink drop printer disclosed by E. Ascoli in U.S. Pat. No. 3,136,594 included methods for deflecting ink drops to compensate for horizontal and vertical distorting motions. A plurality of nozzles oscillates together in a horizontal direction while paper advances in a vertical direction. When a portion of a character is to be printed, ink is drawn from selected nozzles by a pulsed electrostatic field which also induces a uniform charge on such selected drops. The charged drops are then deflected in horizontal and vertical directions in response to signals to form characters. Such methods have disadvantages of not providing a constant horizontal motion for ink drops and of having a limited frequency response due to ink drop transit time through signal responsive deflecting fields. The methods disclosed for compensating ink drop deflections would not provide deflection waveforms required to remove drops not to be printed in the method of the present invention wherein ink drops are selectively charged and deflected in constant deflecting fields.

In conventional character line printers of the impact type, signal responsive hammers strike a moving character band or drum against an inked ribbon and paper which can include carbon sheets for duplication. When a character line is completed, the paper advances. Impact printers generally are limited in speed by the hammer and paper advance mechanisms. Carbon copies are expensive and diminish in graphic quality as their number increases.

Non-impact electrostatic character line printers have a modulated light beam which forms an electrostatic character image on an ink receiving surface on which solid particles of charged ink deposit and are fixed. Although they are not limited by the mechanical constraints of impact printers, electrostatic printers require either expensive photoconductive paper or a complex ink transfer process.

OBJECTS OF THE INVENTION

It is a general object of this invention to provide an improved character line printer.

It is another object to provide a character line printer which rapidly deposits drops of liquid ink on continuously moving ordinary paper to form undistorted characters.

It is yet another object to provide a character line priner which uses components in common to print in parallel on a plurality of sheets of paper.

SUMMARY OF THE INVENTION

These and other objects and advantages are accomplished in accordance with the present invention wherein a flexible endless orifice band having a plurality of uniformly spaced orifices traverses a stationary source of liquid ink which issues from the orifices to form traversing ink drops which are chargeable between a corresponding plurality of signal responsive charging electrodes. Charged ink drops are deflected in direct proportion to their charge in a constant electrostatic field to form successive columns of a character dot matrix as the orifice band advances. In the time that a character is being printed, paper is advancing which would tend to distort the character. Such distortions are prevented by an additional deflection which compensates for paper motion. The voltage waveform on the charging electrodes is derived from three components: a sequence of digital pulses from a character generator, a first ramp voltage which deflects ink drops through a column of a character matrix and then returns to zero to repeat sweeping through successive columns, and a second increasing voltage which is an integral of paper motion and is reset to zero at the beginning of a character. When an ink drop is selected for deposit on paper by the character generator, the voltage is the sum of the first ramp voltages and the second increasing voltage. When an ink drop is not to be deposited on paper, the voltage is zero, the ink drop is uncharged, and projects into an ink catcher. The required pulse modulation of the ramp voltages is provided by coincidence gates.

In another aspect of the present invention, components are used in common to provide simultaneously a plurality of printouts. The voltage waveform just described is transmitted in parallel to corresponding charging electrodes in a plurality of ink drop deflecting assemblies. A common orifice band traverses a common ink source. A plurality of sheets of paper are advanced simultaneously with shared drive components.

Printing speed is limited principally by printer frequency response and by mechanical constraints on paper advance. Drop repetition rates for the method of deflecting selectively charged drops are typically in the range of 30,000 to 300,000 drops per second. For a 7 × 8 character matrix and a 50% character interval, corresponding printing speed is about 20,000 to 200,000 character lines per minute. Corresponding paper speed ranges approximately from 250 to 2,500 feet per minute. It is apparent that continuous paper motion is necessary for rapid printing and that the method of the present invention can be as rapid as mechanical constraints on paper motion allow.

DESCRIPTION OF THE VIEWS OF THE DRAWINGS

Referring to the drawings, FIG. 1 shows basic features of an ink drop printer with a traversing orifice band which is based on deflection of selectively charged ink drops.

Figure 1:
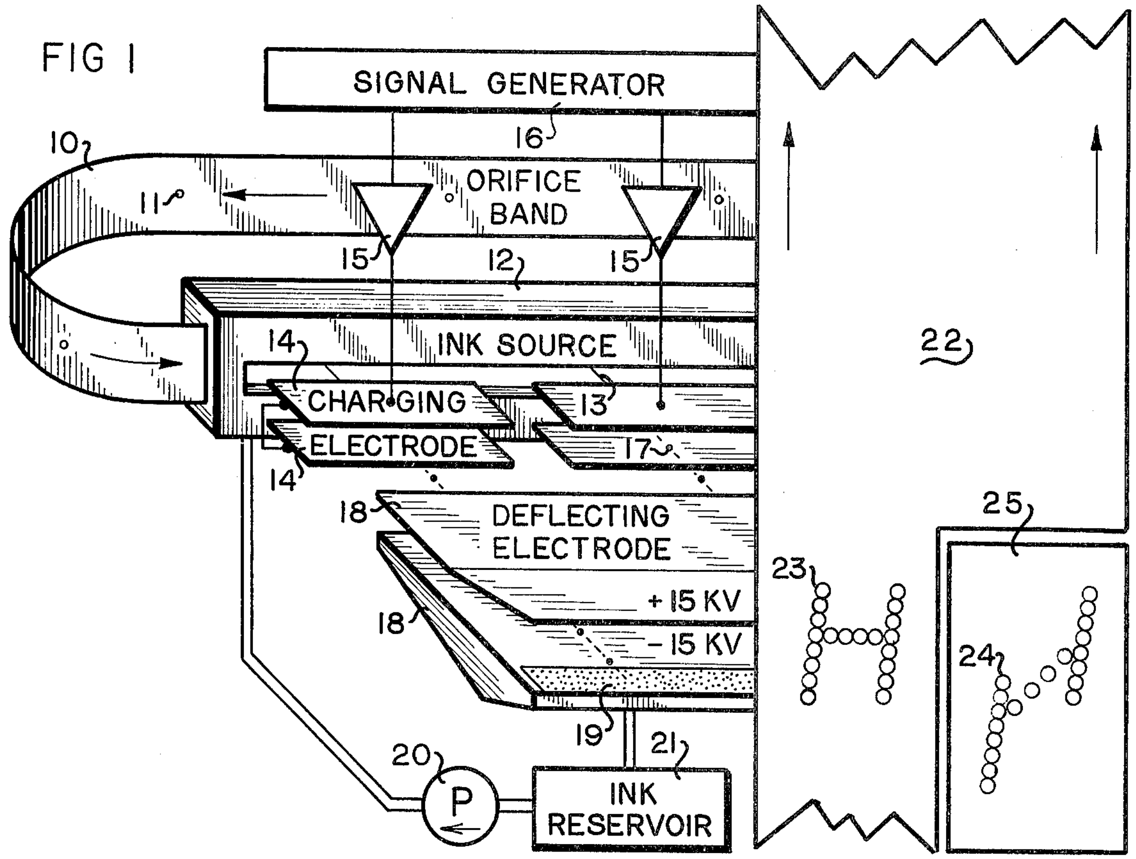
FIG. 1 is a schematic perspective view of the preferred embodiment which is an ink drop printer using the method of selectively charged ink drops to form a line of characters.

A flexible endless orifice band 10 having a plurality of uniformly spaced orifices such as 11 traverses in one direction a stationary ink source 12 which contains liquid ink under pressure. It is preferred that the orifice band moves at a constant speed when the printer is operating. The ink flows from each of the orifices within the ink source in the form of a jet 13. Charging electrodes 14 are joined electrically so that the upper and lower portions are at the voltage level of voltage amplifier 15 which amplifies the output of signal generator 16. As an ink jet projects between charging electrodes, it is electrically charged in proportion to the voltage on the charging electrodes. As the ink jet breaks into ink drops 17 of uniform size which continue along the ink jet trajectory, the electric charge of the ink jet is retained by the ink drops. The ink drops pass between deflecting electrodes 18 which are maintained at opposite voltages. Uncharged ink drops are not deflected, deposit on ink catcher 19, and are drawn by pump 20 into ink reservoir 21 from which ink is pumped to the ink source. Charged ink drops are deflected by an electrostatic field between the charging electrodes in proportion to their level of electric charge and deposit on a paper receiving surface 22 moving in a direction perpendicular to the orifice band traverse.

A printed character is formed as a dot matrix by deflecting ink drops through one column and then repeating the process for succeeding columns. Since the paper moves during printing, the ink drops forming a column are deflected additionally to correspond to the distance the paper will have moved in the time interval required to complete the character. The letter H 23 formed on normally moving paper and the distorted letter H 24 shown as it would appear if paper segment 25 were stationary, illustrate combined effects of orifice band traverse, paper motion, and ink drop deflection. As ink drops in the left column of letter 24 are being deposited in an upward direction, motion of the orifice band inclines the column to the right. Such inclination is uniform for all columns, is not regarded as an objectionable character style, and is retained without compensation. Succeeding columns to the right are progressively shifted upward to compensate for paper motion. On normally moving paper, the left column will be at the level of the right column when printing is completed as is shown by letter 23. Circuit means and waveforms for attaining the required ink drop deflections are disclosed with reference to FIG. 3.

More generally, the method of the present invention includes the step of forming characters by selectively deflecting ink drops in trajectories having a traversing motion in a direction perpendicular to the traversing motion. Several alternative methods for deflecting ink drops from trajectories having a traversing motion are described in the cited copending application Ser. No. 605,992 now U.S. Pat. No. 3,972,053.

An alternative method of electrostatic deflection is based upon uniformly charged ink drops being selectively deflected by a signal responsive electrostatic field. As ink jets from an orifice band pass between charging electrodes having a constant voltage, they form ink drops having a uniform charge. The charged ink drops are deflected selectively when they pass between deflecting electrodes having the voltage waveform described with reference to FIG. 3, but having a higher voltage level and a longer period.

A method of magnetic deflection is based on drops of ink containing colloidal magnetic particles which issue from a traversing orifice band being polarized by a signal responsive electromagnet and then being deflected by a permanent magnet which has a magnetic field with a substantial gradient.

Figure 2:
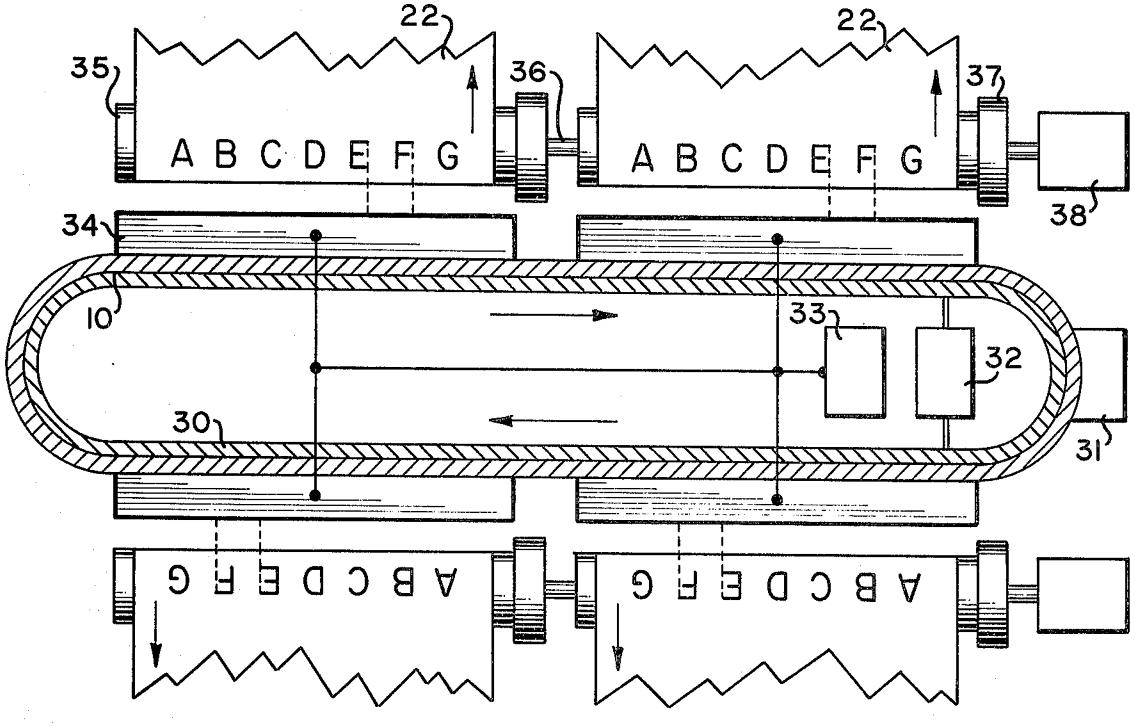
FIG. 2 is a diagrammatic representation of an ink drop character line printer showing basic components and assemblies for producing a plurality of computer printouts in parallel.

In FIG. 2, assemblies for advancing the orifice band and paper are shown in a configuration which uses assemblies in common to provide economically a plurality of copies. A single orifice band in a single ink source traverses a plurality of ink drop deflecting assemblies which receive voltages for the charging electrodes in parallel. Assemblies for advancing paper in response to print commands also have components in common.

Orifice band 10 is positioned in an air bearing assembly 30 which provides frictionless constraint for the orifice band. A linear induction motor 31 provides a noncontacting means for moving the orifice band. A linear induction motor and air bearings combined with an ink source for use with an orifice band are described in more detail in copending patent application Ser. No. 605,993 now U.S. Pat. No. 3,971,040. An ink reservoir and pump 32 provide ink under pressure to a common ink source, not shown, within the air bearing assembly. A signal generator and voltage amplifier 33 connect in parallel to a plurality of ink deflecting assemblies 34 which include the charging and the deflecting electrodes. Paper 22 is advanced by drive rolls 35 which are engaged selectively to a drive shaft 36 by mechanical or electrical clutches 37. The drive shaft is rapidly started and stopped by a paper drive unit 38 which includes an electrical clutch, brake, motor, and controller.

Figure 3:
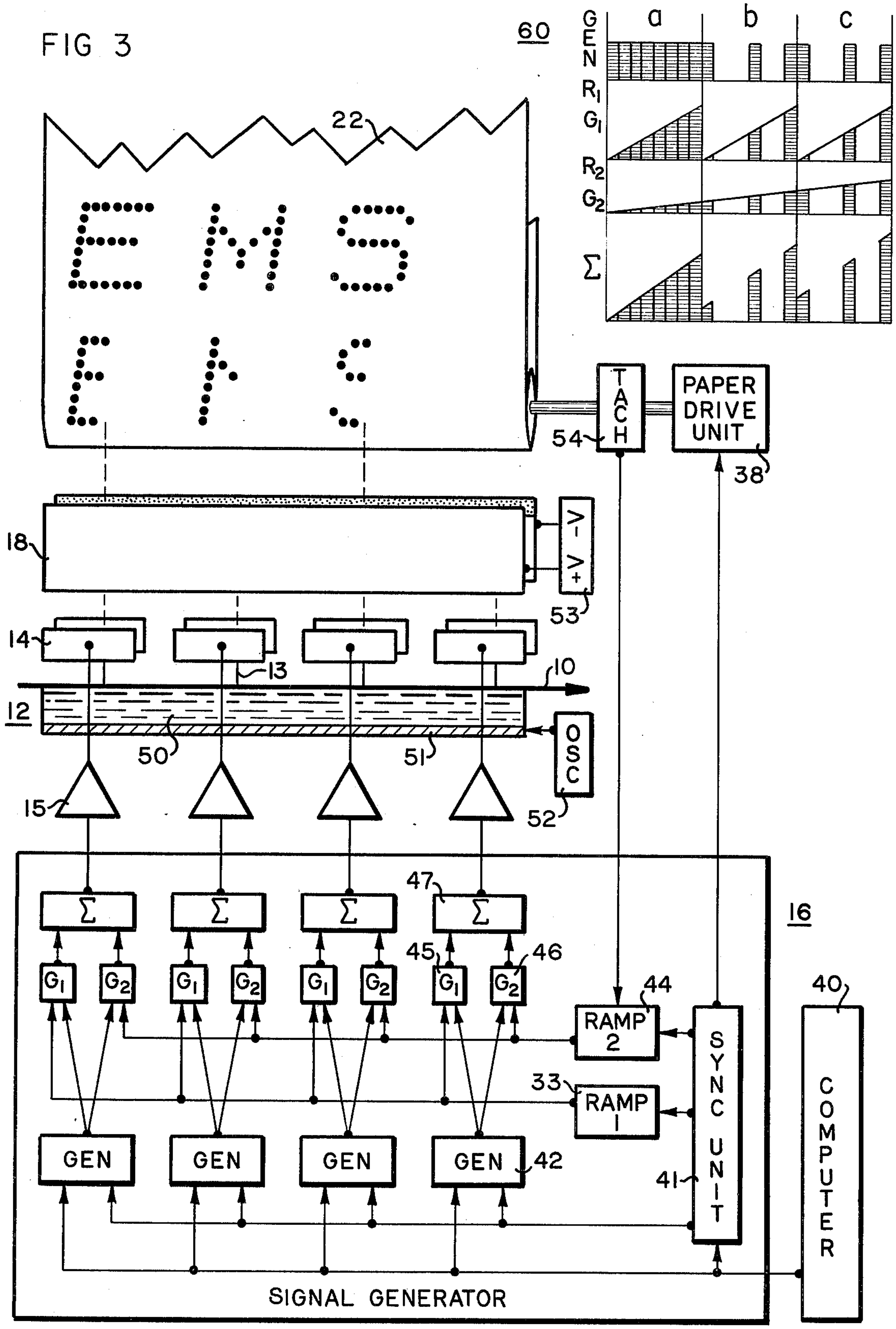
FIG. 3 is a schematic diagram showing in more detail waveforms and means for generating such waveforms to form undistorted characters according to the invention.

FIG. 3 shows schematically apparatus for providing traversing ink drop trajectories and means for deflecting the ink drops to form successive dot columns of a character with additional deflection to compensate for continuous paper motion. Deflection of ink drops along a character column corresponds to an increasing voltage on the charging electrodes when ink drops are to be deposited on the advancing paper, but the voltage on the charging electrodes must be zero when ink drops are to be deposited on the ink catcher. The required waveform is a pulsed ramp voltage having a level of zero when ink drops are not to be deposited on paper and having a voltage level which is the sum of a first ramp voltage with a period of a character column and of a second ramp voltage having a period of a complete character. Corresponding apparatus includes a first ramp voltage generator to provide deflection of ink drops along a character column, a second increasing voltage generator which integrates paper speed to generate a second ramp voltage when paper speed is constant to provide an additional deflection of ink drops corresponding to paper motion in a character interval, summing networks which add the first and the second ramp voltages to provide a composite deflection of the ink drops, digital character generators which form a sequence of pulses corresponding to dots along successive character columns, coincidence gates which combine the ramp and character generator outputs to provide a composite pulsed ramp voltage to determine ink drop deflection, and a synchronizing unit which provides reset and timing functions for the character and ramp voltage generators. The following description includes one embodiment of these circuit components combined in a signal generator.

When computer 40 transmits a print command to signal generator 16, synchronizing unit 41 starts paper drive unit 38. After character codes, which typically are six digit binary numbers for the character set of an 8 × 7 dot matrix, are received from the computer by the synchronizing unit and character generators 42, the synchronizing unit resets and starts first ramp generator 43, resets and starts second increasing voltage generator 44, and provides clock pulses for the character generator to release pulses representing the first column of a character. When the first column is completed, the synchronizing unit resets the first ramp generator and repeats the process for succeeding columns. This process is then repeated for following character lines.

The pulses from the character generator and the output of the first ramp generator are combined in a first coincidence gate 45. The output voltage of the coincidence gate is zero when a pulse is absent and is equal to the input ramp voltage when a pulse is present. The pulses from the character generator and the output voltage of the second increasing voltage generator are similarly combined in a second coincidence gate 46. The outputs of the first and second coincidence gates are added in a summing network 47 and the sum is amplified by voltage amplifier 15 which is connected to charging electrode 14.

Ink 50 emerges under pressure from traversing orifice band 10 as an ink jet 13 which projects between the charging electrodes. A jet is energetically unstable and a periodic disturbance from transducer 51 driven by oscillator 52 couples to the ink jet resulting in its breakup into ink drops of uniform size and phase. The configuration of the cylindrical ink jet as one conductor proximate to the parellel plate charging electrodes as the other conductor is a capacitor, and a length of the ink jet which will form a drop has some capacitance designated C. With the short charging time constant characteristic of aqueous inks and an ink source 12 at ground reference, the charge $q$ on an ink drop is CV where V is the voltage of a charging electrode. An ink drop has an acceleration $qE/m$ where m is the mass of the ink drop and E is the electrostatic field between deflecting electrodes 18 which are connected to voltage source 53. The trajectory of an ink drop between the deflecting electrodes is a parabola with a deflection $qEt^2/2m$ where $t$ is the transit time of an ink drop between deflecting electrodes. Since $t$ together with E and $m$ is constant, deflection is directly proportional to $q$ and thus to V. Accordingly, deflection along a character column is a linear function of charging electrode voltage and a ramp voltage is an appropriate waveform. As paper 22 advances, tachometer 54 generates a voltage which is integrated by the second increasing voltage generator to provide a voltage proportional to paper distance moved from the beginning of printing of a character line.

The chart at 60 shows waveforms for printing the first three columns of the letter E shown on paper 22. The waveforms in chart column a correspond to the first column of the letter E, the waveforms in chart column b correspond to the second column of the letter E, and the waveforms in chart column c correspond to the third column of the letter E. The line labled GEN is the output of the character generator which has a pulse for all dot positions in the first column of the letter E and pulses for the first, fifth, and eighth dot positions in the second and third columns. The line labled $R_1G_1$ shows the output of the first ramp generator and the output of the first coincidence gate as amplitude modulated pulses having the period of a character column. The line labled $R_2G_2$ similarly shows the output of the second increasing voltage generator and the output of the second coincidence gate. The line labled Σ is the sum of the first and second coincidence gates and is proportional to the deflection of an ink drop.

What is claimed is:

1. A method for printing characters by selectively depositing ink drops onto a receiving surface including the steps of
   - forming a plurality of ink drops in a plurality of uniformly spaced trajectoris, said ink drops selected for deposit on a receiving surface, said ink drops projecting toward said receiving surface, said trajectories moving in only one direction,
   - moving said receiving surface in a direction perpendicular to the direction of motion of the trajectories, and
   - deflecting ink drops in said trajectories commonly in a direction perpendicular to the motion of the trajectories, said deflection comprising a first deflection which deflects the ink drops to form successive columns of a character at the receiving surface and a second deflection added to the first deflection to deflect each of the drops at the receiving surface by a distance equal to the distance moved by the receiving surface from the time that printing of a character matrix would begin.

2. The method of claim 1 wherein said second deflection is generated by steps including
   - detecting the motion of the receiving surface, and
   - integrating said detected motion of said receiving surface to generate a signal corresponding to the distance moved by the receiving surface from said time that printing of said character matrix would begin.

3. The method of claim 2 wherein the steps of selecting said ink drops for deposit on said receiving surface and of deflecting said selected ink drops are characterized by
   - forming a plurality of uniformly spaced ink drops in a trajectory projecting toward the receiving surface,
   - inducing an electrical charge on ink drops selected for deposit on the receiving surface, projecting all ink drops in said trajectory through an electric field to deflect said ink drops in proportion to said induced electrical charge, and collecting uncharged and undeflected ink drops to prevent deposit of said ink drops on the receiving surface.

4. Apparatus for printing characters on a receiving surface including:

a receiving surface and means to move said receiving surface, means to form uniform ink drops uniformly spaced in a trajectory projecting toward said receiving surface and means to move said trajectory at a constant velocity in a direction perpendicular to the motion of the receiving surface, means to deflect said ink drops in proportion to levels of a deflecting signal on said deflecting means, said ink drops deflected in a direction perpendicular to said trajectory velocity to deposit some of the ink drops on the receiving surface to form successive columns of a character, means to detect motion of the receiving surface and means to integrate some detected motion to generate a second increasing signal proportional to distance moved by the receiving surface, and means to transmit said second increasing signal to said deflecting means to compensate for motion of the receiving surface.

5. The apparatus of claim 4 wherein generating means for a first ramp signal to deflect said ink drops through said successive columns of a character and said means to generate a second increasing signal are synchronized with a character generator and gated by said character generator to generate said deflecting signal.

* * * * *